Figure 1:
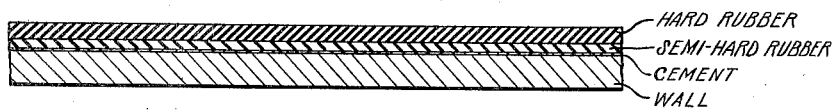

Aug. 1, 1939.  H. H. HARKINS  2,167,716

CHEMICALLY RESISTANT STRUCTURE

Filed Oct. 12, 1935

INVENTOR.
HENRY H. HARKINS
BY
ATTORNEY.

Patented Aug. 1, 1939

2,167,716

UNITED STATES PATENT OFFICE 2,167,716

CHEMICALLY RESISTANT STRUCTURE

Henry Harvey Harkins, River Edge, N. J., assignor, by mesne assignments, to United States Rubber Company, New York, N. Y., a corporation of New Jersey Application October 12, 1935, Serial No. 44,660

3 Claims. (Cl. 154—43)

This invention relates to improvements in chemically resistant structures and more particularly to wall structures bearing rubber coatings or linings whereby to improve their resistance to fracture under widely varying temperature conditions.

Rubber coatings are desirable for the protection of various containers for the storage, transportation and utilization of corrosive or other liquids for example, acids, alkalis, salt solutions, etc. and among which are storage tanks, pickling tanks, electroplating tanks, railway tank cars and the like.

Soft rubber coatings or linings, that is, coatings containing up to 4–5% of combined sulphur, are objectionable because attacked easily by many corrosive liquids and organic solvents and because easily cut or torn. Hard rubber coatings or linings, that is, rubber coatings which have a chemically-combined sulphur content of 30% or more, due to the wide difference between their thermal expansion co-efficients and that of the wall, usually metal, to which it is bonded, tend to become cracked when subjected to widely varying temperature conditions. Such linings are particularly liable to failure at very low temperatures, e. g., 0° to —40° C.

It has also been proposed to line containers with separate overlapping sheets of hard rubber, with a cushion layer of soft, resilient rubber intervening between the hard rubber sheets and the metal wall to absorb the greater relative expansion and contraction of the hard rubber, the lap seams acting as expansion joints. In such a construction, however, the hard rubber has been found to have a much lower impact strength than when it is adhered directly to the metal wall. This is because the soft, resilient cushion layer yields readily and permits excessive local strain and consequent fracture of the hard rubber layer when the latter is subjected to a heavy impact. In commercial practice the impact weakness inherent in such construction has been partially overcome by applying over the hard rubber a protective layer of soft rubber, thus sacrificing, however, the advantage of chemical inertness inherent in the use of hard rubber as the outer layer. Such three-layer linings have been found to be fairly satisfactory, from the point of view of impact resistance, for containers situated indoors or where the prevailing temperatures remain well above freezing temperatures. But at very low temperatures, even though the soft rubber of the cushion layer and the expansion joints continues to function satisfactorily as regards the absorption of stresses due to contraction, the extreme brittleness of the hard rubber at very low temperatures, coupled with the yielding nature of the soft cushion layer, results in very low impact strength. Thus it is seen that rubber lining constructions heretofore proposed leave much to be desired.

An object of this invention is to provide a wall structure whereby to overcome the above disadvantages, and provide one having a high impact strength at all temperatures and substantial freedom from cracking and buckling due to wide temperature changes. Other objects will be apparent from the following description.

Accordingly, the invention comprises interposing between the supporting wall base and a hard rubber sheet or coating, a supporting layer therefor of a rubber or rubber-like material, characterized by a hardness and non-resiliency approaching that of ebonite but having a relatively low modulus of rigidity approaching that of soft rubber. Typical of such an intermediate material is so-called semi-hard rubber which may be obtained by vulcanizing a rubber composition to a chemically-combined sulfur content intermediate between that of soft rubber and that of hard rubber or ebonite, for example a chemically-combined sulfur content of from about 12 to about 20% by weight based on the rubber content, i. e. a coefficient of vulcanization of from about 12 to about 20.

Such semi-hard rubber has at ordinary temperatures a modulus of rigidity on the order of 100 to 1000 pounds per square inch, as compared with a value on the order of 20 pounds per square inch for soft rubber and a value on the order of 100,000 to 200,000 pounds per square inch for hard rubber. By virtue of the relatively low modulus of rigidity of the semi-hard rubber employed in the invention as the supporting layer for the hard rubber sheets, the supporting layer is capable of undergoing sufficient shearing deformation, in directions parallel to the wall surface, to compensate for the differences in thermal expansion and contraction of the outer hard rubber sheets and the metal wall. The structure is thus capable of resisting fracture and separation of the sheets when subjected to wide temperature changes.

Another property of such semi-hard rubber is its ultimate elongation under tensile stress, which is closely related to the modulus of rigidity and may accordingly be used to characterize the material. The ultimate elongation at ordinary temperatures is on the order of 100% of the initial length, as compared with values on the order of 1000% for soft rubber and on the order of 2% to 10% for hard rubber.

By virtue of the hardness and non-resilience of the semi-hard supporting layer, in which properties it is comparable to hard rubber, the hard rubber of my lining structure is not substantially deflected when subjected to heavy impacts and is therefore highly resistant to fracture under such conditions. Furthermore, when the lining is subjected to extremely low temperatures the increase in hardness and brittleness of the hard rubber are paralleled by a corresponding increase in the hardness of the semi-hard rubber supporting layer, so that the characteristic high impact resistance is preserved even at extreme low temperatures.

A convenient method of constructing the lining is to ply together unvulcanized sheets of semi-hard rubber and hard rubber compounds. The plied sheets are then secured to the cleaned, preferably sand-blasted metal wall of the container in known manner by means of a suitable rubber-to-metal adhesive composition, as shown by Fig. 1. The edges of the overlapping sheets are preferably over-skived. The rubber is then vulcanized in place, by filling the container with hot water, or by steam.

Figure 2:
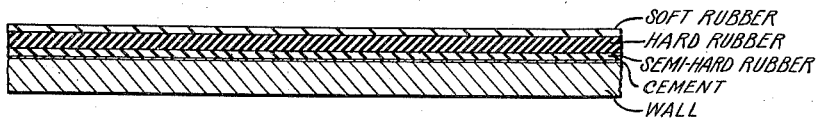

If desired, the lining construction may include as shown by Fig. 2, an outer protective layer of soft rubber over the hard rubber sheets, the mechanical advantages of the underlying structure being wholly retained in such case.

The following table illustrates the superior impact resistance of the lining construction of the present invention. The test specimens were prepared by interposing in construction A, a sheet of semi-hard rubber composition having a thickness of 1/16 inch, between a cleaned metal plate and a sheet of hard rubber composition of a thickness of 1/8 inch, adhesive being applied to the metal surface. In construction B, a soft rubber composition of the same thickness, was substituted for the semi-hard rubber composition. The laminated specimens were then vulcanized, and were tested for impact strength on a Tinius-Olsen impact machine (guillotine type), at various temperatures. In the table which shows the results of the tests, the figures given under the column heading "Height" express the distances through which a five-pound weight fell upon a chisel resting on the hard rubber face of the specimen.

| Type of construction | Temp. | Height | Effect |
|---|---|---|---|
| | °C. | Inches | |
| A | +34 | 46 | None. |
| B | | 21 | Cracked. |
| A | 0 | 46 | None. |
| B | | 15 | Cracked. |
| A | −20 | 46 | None. |
| B | | 18 | Cracked. |
| A | −40 | 46 | None. |
| B | | 30 | Cracked. |

"None" indicates that the hard rubber did not crack under the impact.

Other materials having similar physical properties may be employed as the supporting layer in place of the semi-hard rubber, the essential characteristics being a modulus of rigidity on the order of 100 to 1000 pounds per square inch, or an ultimate elongation on the order of 100%, and a hardness approaching that of hard rubber. Such materials which are to be considered equivalents within the scope of this invention are exemplified by hard rubber which has been made flexible and more extensible by the incorporation in the mix, prior to vulcanization, of fluxing agents which resemble soft rubber but which cannot be vulcanized to a state resembling that of hard rubber, such as polymerized chloroprene (2-chloro-butadiene-1,3), and the plastic, elastic reaction products as disclosed in United States Patents Nos. 2,016,026 and 2,016,027, issued October 1, 1935, and the like.

Having thus described my invention, what I claim and desire to protect by Letters Patent is:

1. A chemically resistant construction comprising a supporting wall and a lining of hard rubber separated therefrom by an intermediate bonding and shock absorbing layer of rubber material containing from about twelve to about twenty percent by weight of sulphur based on the rubber content, substantially all of the sulphur of said intermediate layer being chemically combined with the rubber portion.

2. A chemically resistant construction comprising a supporting wall, and a lining of hard rubber containing at least 30 percent by weight based on the rubber of chemically-combined sulphur, separated therefrom by an intermediate bonding and shock absorbing layer of rubber material having a sulphur content of from twelve to twenty percent by weight based on the rubber content, substantially all of the sulphur of said intermediate layer being chemically combined with the rubber portion.

3. A chemically resistant construction comprising a supporting wall and a lining of hard rubber separated therefrom by an intermediate bonding and shock absorbing layer of rubber-containing material having a hardness and a modulus of rigidity substantially the same as vulcanized rubber having a coefficient of vulcanization of from about 12 to about 20.

HENRY HARVEY HARKINS.